United States Patent [19]

Powers et al.

[11] Patent Number: 5,458,824
[45] Date of Patent: Oct. 17, 1995

[54] METHOD OF MANUFACTURING A RUBBER/PLASTIC CO-EXTRUDATE

[75] Inventors: Thomas O. Powers, Chardon; Timothy T. Hertrick, Stow; Mary A. Peak, Warren, all of Ohio

[73] Assignee: The Geauga Company, Middlefield, Ohio

[21] Appl. No.: 151,705

[22] Filed: Nov. 12, 1993

Related U.S. Application Data

[62] Division of Ser. No. 872,798, Apr. 23, 1992, Pat. No. 5,334,458.

[51] Int. Cl.$^6$ .......................... B29C 47/88; B29C 71/04
[52] U.S. Cl. .................. 264/474; 264/177.19; 264/236; 264/171.28; 264/494; 425/174.8 R
[58] Field of Search .................... 264/22, 177.10, 264/177.16–177.20, 209.4, 236, 209.6, 347, 209.8, 171.26; 425/380, 174.8 R, 379.1, 131.1, 377, 462

[56] References Cited

U.S. PATENT DOCUMENTS

| | | |
|---|---|---|
| 3,864,069 | 2/1975 | Takiura et al. . |
| 4,042,741 | 8/1977 | Bright ................................ 264/177.16 |
| 4,198,554 | 4/1980 | Wayne ....................................... 264/26 |
| 4,214,030 | 7/1980 | Rakes et al. . |
| 4,228,255 | 10/1980 | Fujimoto et al. . |
| 4,329,135 | 5/1982 | Beck ......................................... 264/26 |
| 4,335,227 | 6/1982 | Bender et al. ............................ 264/26 |
| 4,459,250 | 7/1984 | Miura et al. . |
| 4,521,359 | 6/1985 | Tsien . |
| 4,552,521 | 11/1985 | Linnstaedter . |
| 4,576,773 | 3/1986 | Azzola et al. . |
| 4,698,193 | 10/1987 | Bernitz et al. . |
| 4,808,665 | 2/1989 | Patel et al. . |
| 4,853,434 | 8/1989 | Block . |
| 4,869,963 | 9/1989 | Gallucci et al. . |
| 4,897,298 | 1/1990 | Otawa et al. . |
| 4,913,976 | 4/1990 | Brooks et al. . |
| 4,923,759 | 5/1990 | Brooks et al. . |
| 4,963,309 | 10/1990 | Gohlisch et al. . |
| 5,013,379 | 5/1991 | Brooks et al. . |
| 5,123,988 | 6/1992 | Iwasa .................................... 264/177.1 |
| 5,137,675 | 8/1992 | Rabe ....................................... 425/462 |
| 5,183,613 | 2/1993 | Edwards ............................ 264/177.18 |
| 5,240,664 | 8/1993 | Hayashi et al. ..................... 264/177.16 |

FOREIGN PATENT DOCUMENTS

| | | | |
|---|---|---|---|
| 0040336 | 11/1981 | European Pat. Off. ............ 264/177.1 |
| 0178064 | 4/1986 | European Pat. Off. ............ 264/209.6 |
| 0209453 | 1/1987 | European Pat. Off. ............... 264/171 |
| 0372745 | 6/1990 | European Pat. Off. ............... 264/171 |
| 1959804 | 6/1971 | Germany ............................... 264/346 |
| 2-76716 | 3/1990 | Japan ............................... 264/177.17 |

OTHER PUBLICATIONS

1991 Annual Report, Magna International, Inc., Publication Date after 1991, p. 12.

Primary Examiner—Jeffery R. Thurlow
Attorney, Agent, or Firm—Dykema Gossett

[57] ABSTRACT

The present invention provides a non-rusting unitary co-extruded article, which may be used for a variety of purposes, including a seal. The co-extruded article includes at least two dissimilar discrete parts such as a rubber component, referred to herein as the "rubber extrudate," and a thermoplastic component, referred to herein as the "plastic extrudate." A particular advantage of the invention is that the rubber extrudate and thermoplastic extrudate are cohesively joined at their interface. By cohesively joined, it is meant that the two extrudates stick together tightly without the necessity of a separate adhesive. Where hardness is desired of the thermoplastic extrudate, ethylene vinyl acetate is generally preferred. Where a seal is desired, the rubber extrudate includes ethylene propylene diene rubber, which provides a suitable seal. The invention also relates to a method for making the same.

19 Claims, 6 Drawing Sheets

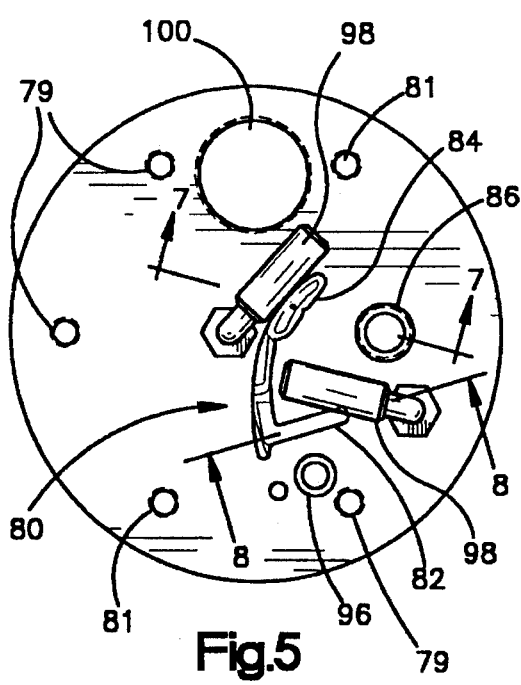
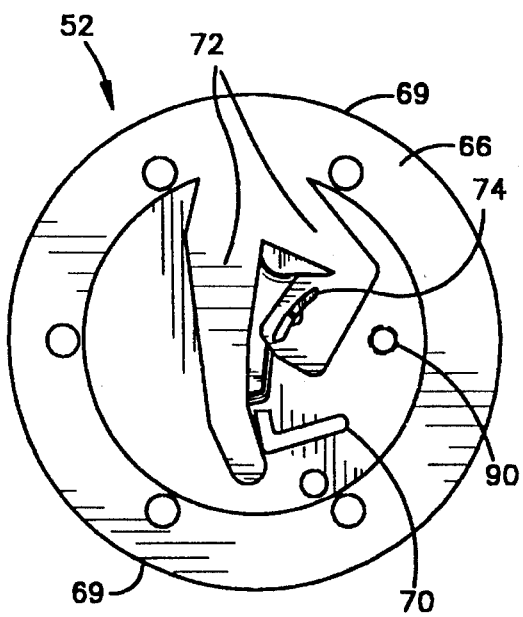
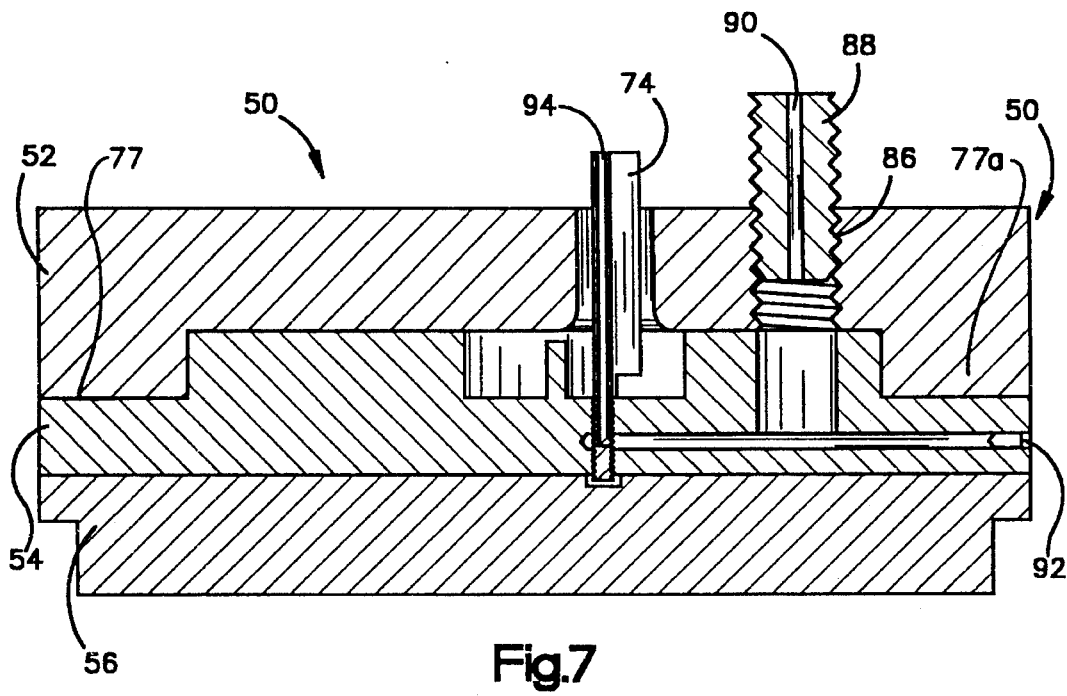

5,458,824

METHOD OF MANUFACTURING A RUBBER/PLASTIC CO-EXTRUDATE

This is a divisional of application Ser. No. 07/872,798 filed on Apr. 23, 1992, now U.S. Pat. No. 5,334,458.

BACKGROUND OF THE INVENTION

Seals, such as, for example, gaskets, are comprised of a flexible soft material, typically rubber. The softness and flexibility of the rubber permits the rubber to conform to the adjacent surface to provide a seal. Suitable rubbers for seals, such as ethylene propylene diene monomer rubbers, are well known. Seals generally require a second rigid material, attached to the rubber, to provide a surface for attaching the rubber. Typically, this rigid material has been a metal, such as steel. However, steel has several disadvantages; cost and a propensity to rust. Attempts have been made to substitute the steel rigid material with plastic; plastic provides rigidity at a lower cost and will not rust. However, joining plastic to rubber, as in joining rubber to steel, presents several problems. Joining the plastic to rubber has been conventionally accomplished by adhesives and/or clips. However, joining any dissimilar materials with an adhesive often may result in a joint that may over time fail.

It would be advantageous to ..have an article containing a rubber component and a plastic component having a continuous strong joint between the rubber and plastic, that will not rust.

SUMMARY OF THE INVENTION

The present invention provides a non-rusting unitary co-extruded article, which may be used for a variety of purposes, including a seal. The co-extruded article is comprised of at least two dissimilar discrete parts such as a rubber component, referred to herein as the "rubber extrudate," and a thermoplastic component, referred to herein as the "plastic extrudate." A particular advantage of the invention is that the rubber extrudate and thermoplastic extrudate are cohesively joined at their interface. By cohesively joined, it is meant that the two extrudates stick together tightly without the necessity of a separate adhesive. Where hardness is desired of the thermoplastic extrudate, ethylene vinyl acetate is generally preferred. Where a seal is desired, the rubber extrudate comprises ethylene propylene diene rubber, which provides a suitable seal. The invention also relates to a method for making the same.

BRIEF DESCRIPTION OF THE DRAWINGS

FIG. 5 is a view of the die face of the front die plate;

FIG. 6 is a view of the front surface of the middle die plate;

FIG. 7 is a sectional view taken substantially along the lines 7—7 of FIG. 5;

DETAILED DESCRIPTION OF THE INVENTION

Figure 1:
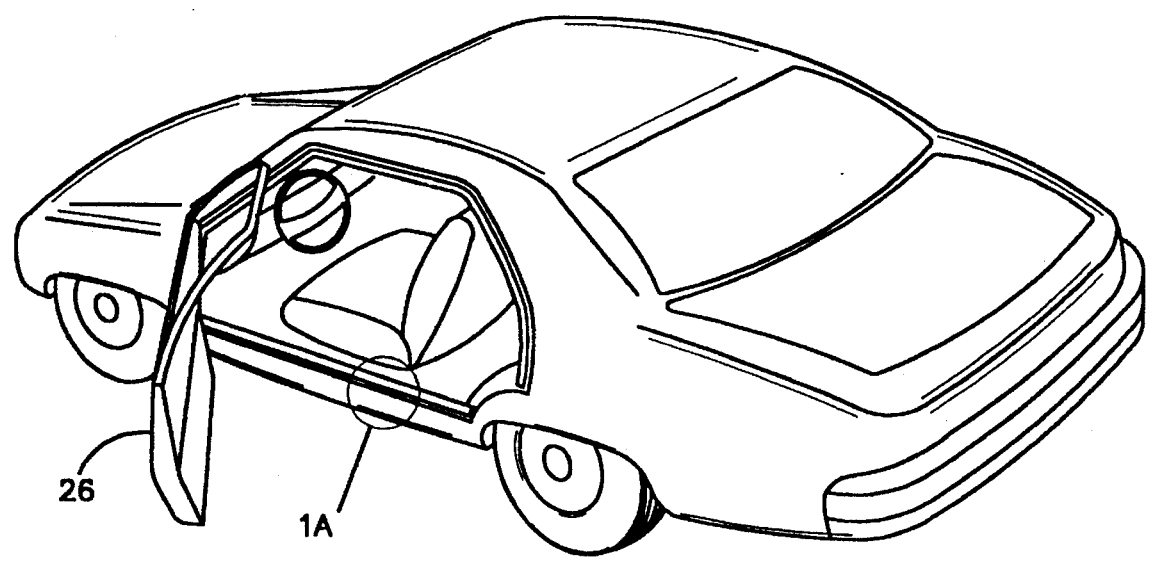
FIG. 1 is a perspective view of the seal embodiment of the co-extrudate in use as a door seal.
Figure 1A:
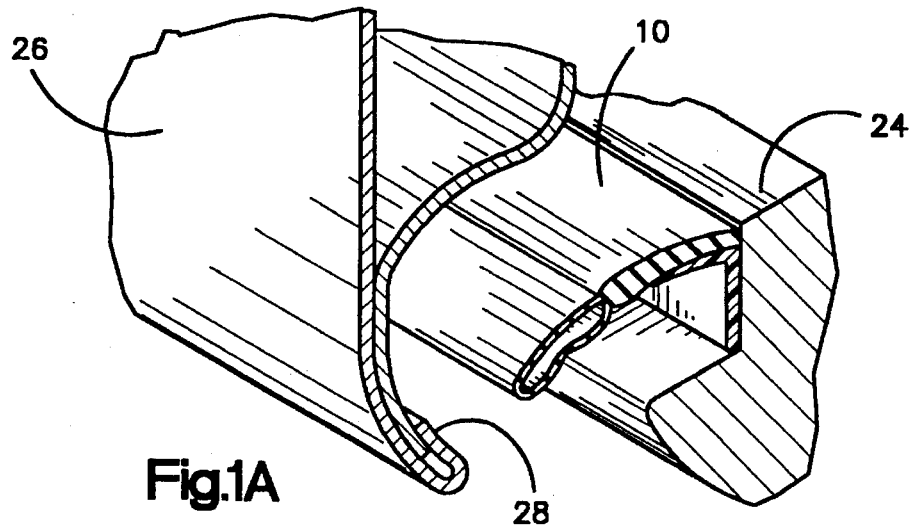
FIG. 1A is a detailed view of a portion of FIG. 1 on an enlarged scale.

The present invention is shown in a seal embodiment in use in FIGS. 1 and 1A. The present invention provides a co-extruded article 10, comprised of a rubber extrudate 14, and a plastic extrudate 18. A particular advantage of the invention is that the rubber extrudate 14 and plastic extrudate 18 are cohesively joined at their interface 20. The rubber extrudate 14 has been extruded to contain void 22 running the length of the rubber extrudate 14. The cohesive interface 20 provides the advantage of a strong, continuous bond between the two materials which does not necessitate adhesives, clips, or the like, and which will not rust and is resistant to failure at the interface.

The invention has the advantages of providing in a unitary structure the properties of both plastic and the rubber at the locations where these properties are needed. The plastic, which contributes rigidity and form to the article, has several advantages over steel: plastic is lower in cost, it doesn't rust, it can take color so as to provide a finished surface, it is lighter weight and can be formed to occupy less space. The rubber has superior sealing properties such as conformity at the sealing junction with another member.

In the seal embodiment, where elevated hardness is desired of the plastic extrudate, ethylene vinyl acetate is generally preferred. In the broader application, this invention may provide a co-extrudate of two dissimilar discrete materials. By dissimilar discrete materials it is meant materials which upon meeting will not substantially mix and will retain their characteristic properties. The rubber extrudate comprises ethylene propylene diene rubber which provides a suitable seal. The co-extruded seal exhibits: outstanding toughness, particularly at low temperatures; flexibility; resilience; environmental stress crack resistance; excellent ozone resistance; and performance within a temperature range from at least as low as −40° F. to at least as high as 200° F. The co-extrudate 10 in the seal embodiment is particularly designed for, and is particularly useful as an automobile door seal as shown in FIG. 1. The plastic extrudate 18 is affixed to the rocker panel 24 of the car. When the car door 26 is closed the lower interior portion of the door 28 comes in contact with the rubber portion 14 to provide a conformed seal.

Figure 2:
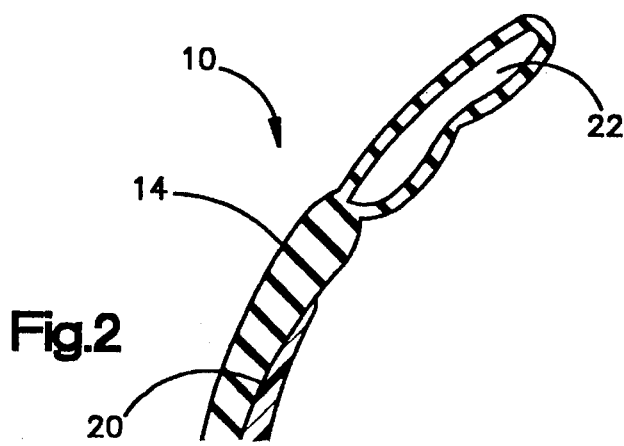
FIG. 2 is a transverse-sectional view of the seal embodiment of the co-extrudate.

In the seal embodiment, the rubber is typically extruded in a "profiled" form to provide a rubber extrudate having a longitudinal void 22 as shown in FIG. 2. This will enhance its sealing properties in that it provides improved flexibility and compressibility to the rubber extrudate 14 as it abuts against the car door 26.

The present invention also relates to a method for co-extruding two dissimilar materials like rubber, such as, for example, ethylene propylene diene monomer (EPDM) and a plastic, such as, for example, ethylene vinyl acetate (EVA). The invention also relates to an apparatus and process for forming the co-extrudate involving the use of two extruders, one extruder for each material, such as a rubber extruder and a plastic extruder. The extruders and the die are set so that the rubber and plastic meet right before the die face where they are extruded. The method and apparatus for extruding will be described presently.

Materials

The Plastic Extrudate

Figure 3:
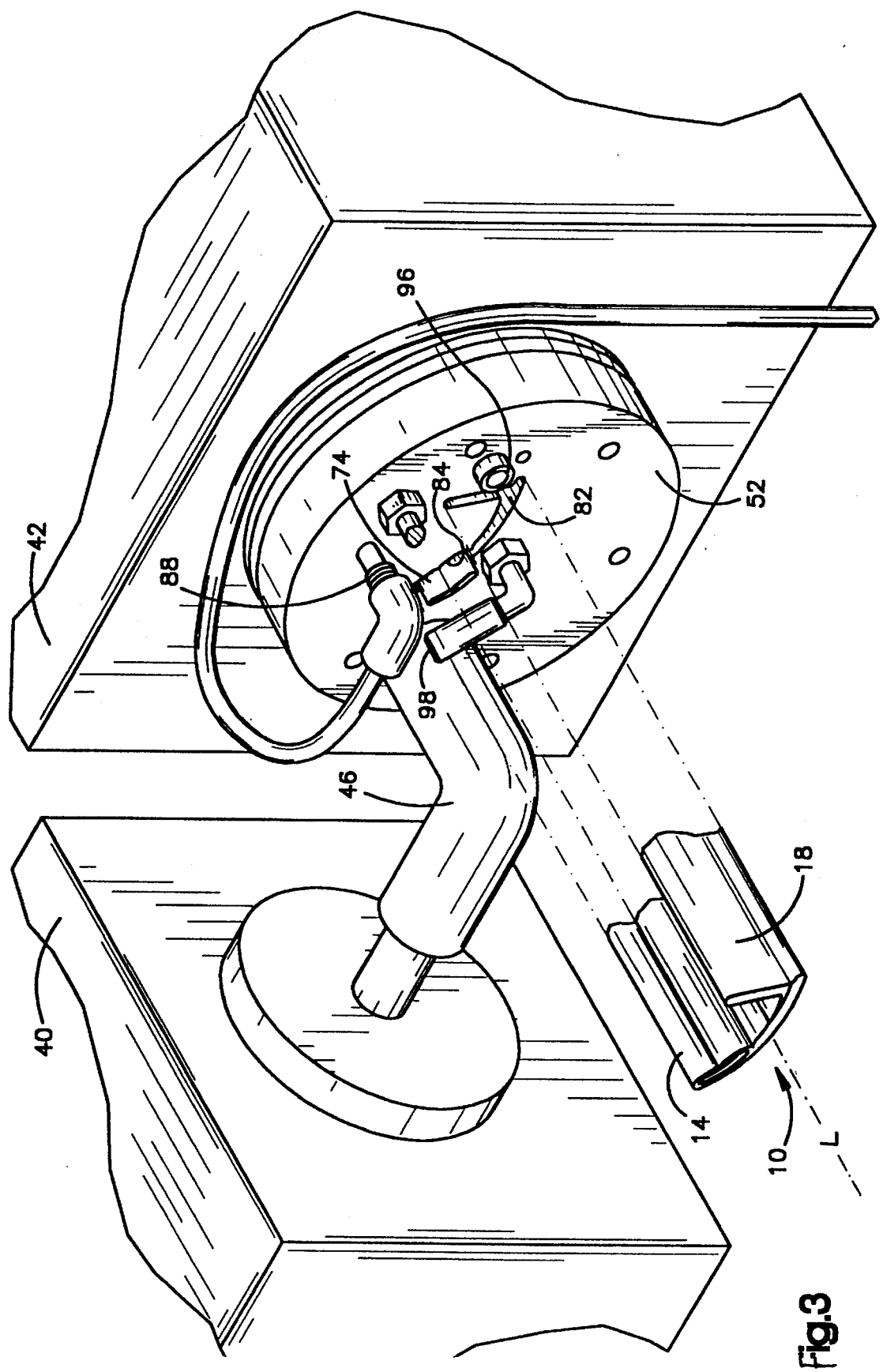
FIG. 3 is a perspective view of the die showing the co-extrudate being extruded.
Figure 4A:
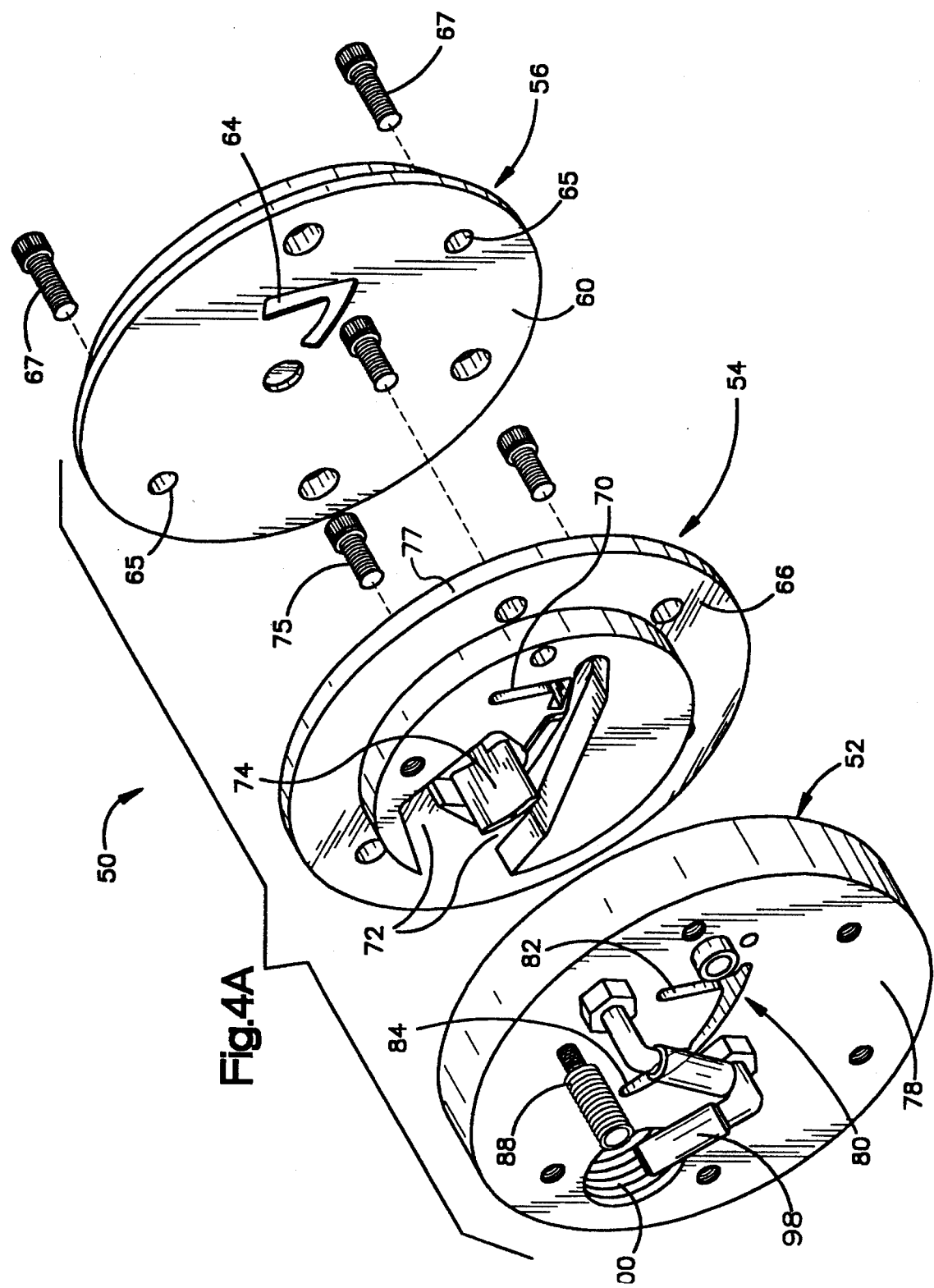
FIG. 4A is an exploded view of a die face parallel the co-extrudate showing the front surface of the die face and the front surface of each die plate.
Figure 4B:
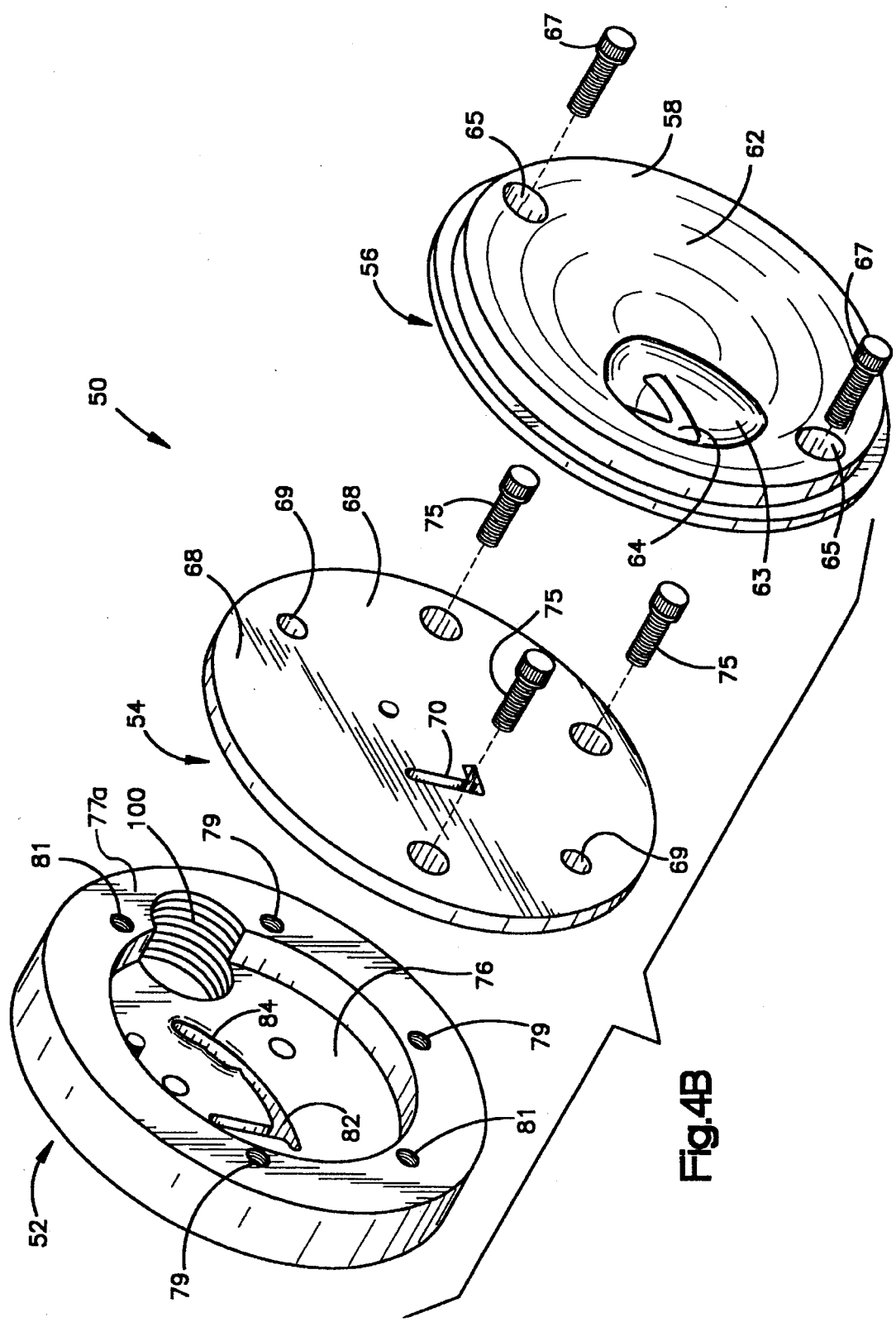
FIG. 4B is an exploded view of the die showing the back surface of each die plate.
Figure 8:
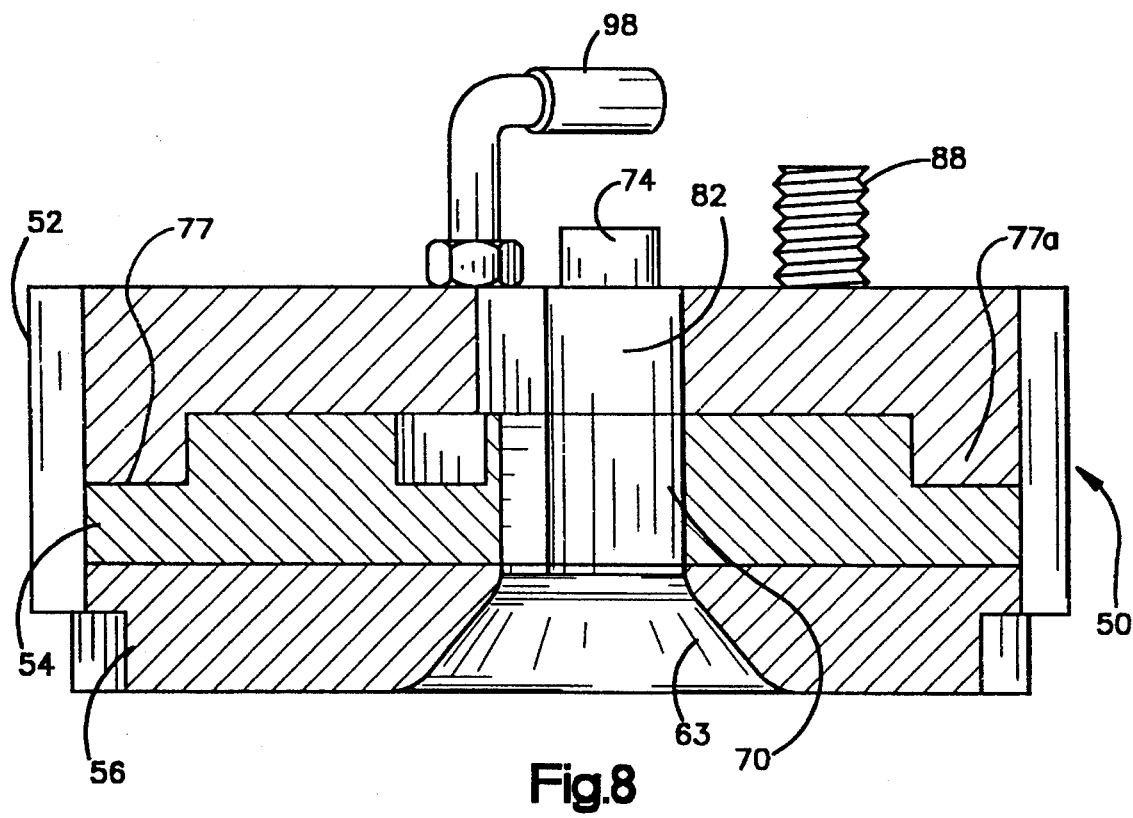
FIG. 8 is a sectional view taken substantially along the lines 8—8 of FIG. 5; and, FIG. 9 shows the back surface of the rear die plate.
Figure 9:
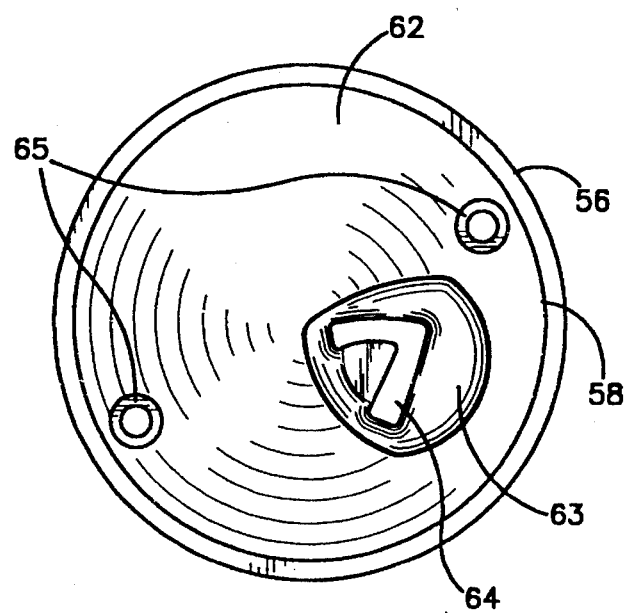

The plastic extrudate 18 may be made from any of a variety of thermoplastic materials including, for example, Poly-2,6-dimethyl-1,4-phenylene ether (available under the trade name "Vestoran" from Huls), or ethylene vinyl acetate, "EVA." The selection of the type of plastic depends on the end use of the co-extrudate and the desired properties of the plastic extrudate. Where a relatively hard material is desired, that is it is desired that the plastic have a durometer value of at least 95 Shore A, EVA is preferred. While many types of EVA may be used, good results have been obtained using "Elvax 770" available from Dupont. While the precise formulation of Elvax 770 is proprietary, the Elvax 770 contains about 9.5% moles of vinyl acetate, and has a melt index of about 0.8 dg/min. The EVA starting material may be pelletized, flaked or in other forms. It should also be understood that commercially available EVA may contain additives, such as initiators and accelerators. In the seal embodiment, the plastic is typically extruded to provide a solid plastic extrudate 18, as shown in FIGS. 1A and 3, and in cross section in FIG. 2.

The Rubber Extrudate

A variety of rubbers including, for example, ethylene propylene diene monomer, "EPDM," silicone or an EPDM/silicone blend or mixtures thereof, may be used to produce the rubber extrudate 14. The selection of the type of rubber depends upon the end of use of the co-extrudate. Typically, the rubber should have a shore A durometer value of from about 40 to about 90. Where the end use of the co-extrudate is a seal, which may require, for example, a soft rubber having a durometer of about 50, good results have been obtained using ethylene propylene diene monomer rubber, "EPDM" rubber EPDM is available commercially and good results have been obtained using a blend of EPsyn® P597 and EPsyn® 5508 available from Copolymer Company. EPsyn® P597 contains 61% ethylene and 35.9% propylene; the diene, which is ethyl diene norborene, is present in about 3.1%. The EPsyn® is an oil extended rubber, that is, 100 phr of naphthenic oil has been added to the rubber. EPsyn® 5508 contains 69% ethylene and 27.0% propylene. The diene, which is ethyl diene norborene, is present in the amount of about 4.0%. In the blended EPDM, the EPsyn® P597 is present in an amount of from about 10% to about 90%, preferably 50% of the total amount of rubber amount; while the EPsyn® 5508 is present in an amount of from about 10% to about 90%, preferably 50% of the total amount of rubber. The addition of the oil extended rubber, such as the EPsyn® P597, will provide a softer rubber extrudate.

Carbon Black

Carbon black is added to the rubber, not only as a filler and reinforcer, but also to aid in rendering the rubber sensitive to microwave radiation. In this manner, the rubber extrudate portion of the co-extrudate may be selectively heated by microwave radiation to finalize the curing of the rubber without adversely affecting the plastic portion of the extrudate. While generally any type of carbon black can be used, good results have been obtained using GPF N-650 carbon black, available under the trade name "Continex N-650" from Continental Carbon Company or "Statex GH N-650" from Columbian. The carbon black may be added in an amount from about 50 phr to about 250 phr, preferably about 100 phr to about 160 phr, more preferably about 125 phr.

Various other additives, discussed subsequently, are added to the rubber to provide the rubber formulation that becomes the rubber extrudate.

Other Ingredients

Curing agents are necessary for the rubber to cure. A variety of the commercially available curing agents may be used, including, for example, peroxides and sulfur. Sulfur is preferred where the rubber is EPDM, particularly where EPDM is co-extruded with EVA. However, when the plastic extrudate is poly-2,6-dimethyl-1,4-phenylene ether, it is preferred that peroxide be used to cure the EPDM. Generally peroxide is used in an amount from about 2 to about 20 phr, preferably about 6 to 8 phr, preferably about 7 phr. Sulfur is used as a curing agent in an amount from about 0.1 to about 20 phr, preferably about 0.5 phr to about 3 phr, preferably about 0.7 phr.

While curing of the rubber can be accomplished in rubber having a high percentage of sulfur, the time required is too long to be economical and the properties of the cured rubber are less preferred. Accordingly, a cure accelerator is preferred. There are a considerable number of cure accelerators known in the rubber formulation art which may be suitable for addition to the rubber. Suitable organic accelerators include, for example, tetramethyl thiuram disulfide, zinc dibutyl dithiocarbamate, 2-mercapto benzothianzole (1.5%), dipenthamethylene thiuram, zinc dimethyldithiocarbamate and mixtures thereof. Suitable inorganic accelerators, such as, for example, calcium oxide, magnesium oxide, lead oxide and mixtures thereof, may also be used. Generally, a cure accelerator is added in an amount from about 0.5 phr to about 6 phr, preferably 2.5 phr.

Good results have been obtained using a combination of the following accelerators: tetramethyl thiuram disulfide, available under the trade name "Methyl Tuads" from R. T. Vanderbilt Co., in an amount from about 0.5 phr to about 1 phr, preferably about 0.80 phr; zinc dibutyldithiocarbamate, available under the trade name "Butyl Zimate" from R. T. Vanderbilt Co., in an amount from about 0.5 phr to about 3 phr, preferably about 0.5 phr, dipenthamethylene thiuram, available under the trade name "Tetrone A" from Dupont, in an amount from about 0.5 phr to about 1 phr, preferably about 1 phr, zinc dimethyldithiocarbamate, available in a 75% active dispersion from Rhein Chemie, under the trade name "Methyl Zimate," in an amount of 0.5 phr to 1 phr, preferably about 0.8 phr; 2-mercaptobenzothiazole, available under the trade name "MBT" from Uniroyal, in an amount from about 1 phr to about 3 phr, preferably about 1.5 phr, and calcium oxide, used in a 90% active dispersion under the trade name "Elastocal 90," from Elastochem Incorporated in an amount from about 8 phr to about 15.00 phr, preferably about 10 phr.

The activation of curing agents, such as sulfur, are typically enhanced by, for example, zinc oxide, and stearic acid and mixtures thereof. An 85% active zinc oxide dispersion, available under the trade name "Zic Stick 85" from Rhein Chemie, may be used in the amount from about 0 phr to about 40 phr, preferably 5 phr to about 6 phr, more preferably about 5.75 phr.

Although optional, there are a great number of plasticizers and processing aids known in the rubber formulation art, which may be suitable for addition to the rubber. The selection of plasticizers and processing aids depends on the desired property of the rubber, particularly before it is cured. Plasticizers and processing aids are added to the rubber formulation to increase the incorporation of ingredients during mixing, promote the flow of the rubber, and to facilitate processing.

Suitable plasticizers include paraffinic oils, naphthenic oils, aromatic oils and mixtures thereof.

Good results have been obtained from using a paraffinic oil of high molecular weight, available under the trade name "Sunpar 2280" from Sunpar Company. The formulation of the Sunpar 2280 is proprietary; it has a molecular weight from about 600 grams/mole to over 700 grams/mole. The paraffinic oil is generally added to the rubber formulation in an amount from about phr to about 200 phr, preferably 50 phr to about 100 phr, preferably about 75 phr.

Suitable processing aids include, for example, calcium stearate, polyethylene glycol, hydrocarbon resins, fluorochemical alcohols calcium carbonate, or mixtures thereof.

Good results have been obtained using both calcium stearate in an amount from about 1 phr to about 5 phr, preferably about 3 phr, and polyethylene glycol, in an amount from about 2 phr to about 4 phr, preferably about 2 phr. The calcium stearate improves the stability of the uncured rubber, and the polyethylene glycol improves the flow of the rubber through the die.

In addition, the rubber or plastic extrusion may contain optional ingredients such as colorants, dyes, fungicides and fillers. Colorants must be non-polar so as not to be affected by microwave radiation.

Forming the Product

The co-extrudate 10 of the soft rubber extrudate 14 and the rigid plastic extrudate 18 is made using two extrusion machines, a rubber extruder 40 and a plastic extruder 42 as shown in FIG. 3. The rubber extruder 40, preferably is a 3 ½ inch diameter Davis Standard extruder which is a "cold feed" tuber; i.e., the rubber, which is fed in strips, is room temperature. The rubber extruder is of conventional design and has a barrel (not shown) which has four heating zones. The four barrel zones are set at temperatures between 150° F. and 170° F. to control the temperature of the rubber during extrusion in a well known manner. The rubber extruder 40 is aligned at 90° to the extrusion line.

The plastic extruder 42 is aligned with the extrusion line "L."

The plastic extruder 42 is a 3 ½ inch diameter NRM extruder which is operated in a conventional manner. The plastic is fed into a hopper (not shown), typically in a pelletized form. If desired, color additives, which come in a variety of forms, are mixed in appropriate ratios with the plastic before being placed into the hopper. The barrel (not shown) of the plastic extruder 42 is divided into five zones. The temperature of each zone can vary from 200° F. to 400° F. Conventional means such as a breaker plate and three screen packs (not shown) may be placed before the die 50 to screen out foreign objects in a well known manner.

While either extruder could be equipped with the die that forms the co-extrudate, good results have been obtained using a die 50 affixed to the plastic extruder 42. The die 50 is mounted by conventional means (not shown) on the plastic extruder 42. The rubber extruder 40 is fitted with an adaptor 46 comprised of pipes and elbows through which extruded rubber enters and is carried to the die 50. As shown in FIGS. 3–9, the die 50 is comprised of three die plates 52, 54, 56. The rear die plate 56 abuts the extruder 42 and has rear surface 58 and front surface 60. The rear surface 58 has a concave surface 62 for receipt of the plastic. The rear surface 58 has a further concavity 63 surrounding die opening 64 which opening generally conforms to the configuration of the plastic to be extruded.

The rear die plate 56 has two openings therethrough 65 for the two bolts 67. Bolts 67 affix the rear die plate 56 to middle die plate 54 and to front die plate 52. The middle die plate 54, has front surface 66 and rear surface 68. Middle die plate 54 has two drilled holes 69 to receive bolts 67. The rear surface 68 abuts the front surface 60 of the rear die plate. The rear surface 68 has an opening 70 extending therefrom through to the front surface 66 and generally conforming in configuration to the plastic to be extruded and which opening is aligned with opening 64. The front surface 66 of the middle die plate 54 has a "J" shaped slot 72 for receipt of the rubber. The "J" shaped slot 72 also has mounted therein a core 74 which extends perpendicularly away from the plane of the middle die plate 54. The core 74 conforms to the shape of the void/bulb 22 in the rubber extrudate 14. Middle plate 54 has three openings therethrough for bolts 75. Bolts 75 affix the middle die plate 54 to the front die plate 52. Middle plate 54 has an annular alignment rib 77.

The front die plate 52 has a rear surface 76 which abuts the front surface 66 of the middle die plate 54. Front die plate 52 which has an annular alignment rib 77a. Front die plate also has a front surface 78. Front die plate 52 has three threaded holes therethrough 79 to receive bolts 75 and two threaded holes 81 to receive bolts 67. The front die plate 52 has an extrusion opening 80 extending therethrough which conforms in shape to the final shape of the co-extrudate 10. The extrusion opening 80 is a single orifice which has two segments 82, 84. One segment 82 conforms in shape to the plastic and is aligned with the openings 64, 70. The second segment 84 conforms in shape to the rubber to be extruded and such segment communicates with the j slot 72. The core 74 projects through the second segment 84 to define an annular configuration that is the void 22 for the rubber. Segments 82 and 84 are positioned to extrude a single unitary co-extrudate 10 having a cohesive interface.

Front surface 78 also has a perpendicular threaded bore 86 for receipt of the threaded shaft 88 which extends through front die plate 52 and is aligned with shaft 90, in middle die plate 54. Shaft 90 interconnects with radial shaft 92 located within the middle of die plate 54. Radial shaft 92 interconnects to bore 94 which extends through the core 74. The front surface 78 also has a blind threaded bore 96 for receipt of a conventional thermocouple and/or conventional heating device for heating the front die plate 52. Also mounted on the front surface 78 of the front die plate 52 are shapers 98 which may be positioned to shape the co-extrudate as it is being extruded. The rear surface has an opening 100 to receive rubber connection of adaptor 46.

Thus, the plastic extruded from extruder 42 encounters the rear surface of rear die plate 58. The rear surface of the die 50 has a concave surface 62 surrounding a steeper concave surface 63 which surrounds the die opening 64. This streamlining prevents the plastic from hitting dead spots and becoming stagnant, and allows for proper flow of the plastic. The plastic enters the die through opening 64. The plastic proceeds through openings 64 and 70 through segment 82 of the front die opening 80. The rubber extruded from rubber extruder 40 enters and is carried by adaptor 46 to enter opening 100 on the front surface 78 of the die 50. The rubber enters the J shaped slot 72 where it fills the slot 72 and surrounds the core 74. The rubber is then extruded back along the same direction which it entered. The rubber and plastic are physically separated until just before the rear surface 76 of the front die plate 52. The two materials are then co-extruded through orifice 80 of die plate 52. The rubber, which begins curing shortly before entering orifice 80, cross links with the plastic to provide a cohesive interface 20. Air, supplied from the bore 94 at the end of the core 74, is forced into the bulb, that is, void 22 of the rubber extrudate 14 to prevent the bulb profile from collapsing and loosing its shape. The shapers 98 may be positioned to gently shape the warm co-extrudate 10. Portions of the front die plate 52, may be heated by the use of a conventional heating means inserted through bore 96.

The co-extrudate 10, after it comes out of the die 50, is placed onto a conveyor of a microwave unit. The belt on the conveyor moves approximately 29 feet per minute. The air inside the microwave is set at approximately 145° F. to about 150° F., to heat the exterior of the co-extrudate, particularly the rubber extrudate. The air should not exceed 150° F. since the plastic component would tend to lose its shape if the temperature was any higher than 150° F. The co-extrudate 10 is exposed to microwave radiation which selectively heats the rubber extrudate and further cures the rubber. Since the plastic is not affected by the microwave radiation, it is not heated beyond the ambient air temperature of the microwave.

After the co-extrudate 10 is exposed to the microwave radiation, coatings may, optionally, be applied using conventional equipment, such as a spray coating booth. Thereafter, the co-extrudate is conveyed to a hot air oven. While on the conveyor to the hot air oven, air chillers and/or a water spray are used to selectively cool the plastic extrudate; generally this cooling enables the plastic component to maintain its shape through the rest of the process.

The hot air oven is used to cure the optional coating, and also to finish curing the rubber. The oven must be kept at low temperatures, at or below about 200° F. to avoid melting the plastic extrudate. The co-extrudate is maintained in the hot air oven for about one minute.

Next, a puller conveyor is used to pull the co-extrudate from the hot air oven to water cooling tanks under uniform tension. The water cooling tanks have conveyors which transport the co-extrudate through water, which is also sprayed onto the part. At this point, it is possible to shape the plastic before it completely cools. Rollers can be used to shape the plastic extrudate. After the co-extrudate leaves the cooling tank, it can either be cut to length or have secondary operations, such as punching or notching performed. Thereafter, further modification may be done by the customer.

EXAMPLE 1

A co-extrudate according to the present invention was prepared as follows. The rubber formulation was prepared by adding the following ingredients and mixing for about 5.5 minutes at a final temperature of about 245° F.

| Rubber Formulation | | |
|---|---|---|
| Material | 100 RHC | KG |
| 1) Ethylene Propylene Diene Monomer | 98.00 | 42.18 |

| -continued | | |
|---|---|---|
| Rubber Formulation | | |
| Material | 100 RHC | KG |
| (Diene ENB) 100 phr Naphthenic Oil EPsyn ® P597, from Copolymer Co. | | |
| 2) Ethylene Propylene Diene Monomer (Diene ENB) EPsyn ® 5508, from Copolymer Co. | 52.00 | 22.23 |
| 3) Carbon Black (N-650), from Continental | 125.00 | 53.98 |
| 4) Paraffinic Oil (plasticizer) Sunpar 2280, from Sunpar Co. | 75.00 | 32.21 |
| 5) 85% Active Zinc Oxide Dispersion (activator) Zic Stick 85, from Rhein Chemical | 5.75 | 2.49 |
| 6) Calcium Stearate (processing aid) from Harwick Chemical Co. | 3.00 | 1.32 |
| 7) Polyethylene Glycol (processing aid) Carbowax PEG 3350 from Harwick Chemical | 2.00 | 0.86 |
| 8) 2-Mercapto Benzothiazole (accelerator) MBT, from Uniroyal | 1.50 | 0.64 |
| 9) Sulfur (curing agent) from Harwick Chemical Co. | 0.70 | 0.32 |
| 10) Zinc Dibutyl Dithiocarbamate (accelerator) butyl zimate from R. T. Vanderbilt Co. | 0.50 | 0.23 |
| 11) Dipenthamethylene Thiuram (accelerator) Tetrone A Dupont | 1.00 | 0.45 |
| 12) 90% Active Calcium Oxide Dispersion (accelerator) Elastocal 90, from Elastochem | 10.00 | 4.31 |
| 13) Tetramethyl Thiuram Disulfide (accelerator) Methyl Tuads, from R. T. Vanderbilt Co. | 0.80 | 0.36 |
| 14) 75% Active Methyl Zimate Dispersion | 0.80 | 0.36 |
| in Ethylene/Propylene Rubber (accelerator) from Rhein Chemical | | |
| Total | 376.05 | 161.94 |

The amount of the rubber ingredients varied within 0.07 kilograms. After the rubber formulation was thoroughly mixed, the rubber was cooled to room temperature and cut into strips.

The rubber was then fed into the Davis Standard Extruder according to the method outlined above. The ethylene vinyl acetate was fed into the hopper of the NRM extruder in a pelletized form with 0.5% of EV-436 Black colorant. The rheostat on the plastic extruder was set to 2.8° and the temperatures in the five barrel zones were as follows: the rear zone (zone 1), nearest at the hopper, was set at 250° F.; the rear center zone (zone 2), was set at 300° F.; the center zone (zone 3), was set at 300° F.; the front center zone (zone 4), was set at 320° F.; and the front zone (zone 5), was set at 330° F. The die head and adapter was set at 350° F. The rheostat on the rubber extruder was set to 1.6. The rubber extruder was set at 160° for the rear, center and front barrel zones. The fourth zone, the zone where the rubber enters the adaptor was set at 180° F. The co-extrudate 10 was produced as outlined above. The microwave generator 1 was set at 3.8 kilowatts, generator 2 was set at 4.0 kilowatts, and generator 3 was set at 4.0 kilowatts. The support air within the microwave was 140° F. The hot air oven was set to room temperature. Samples were taken from one extrusion run using an average of 3 batches of material. The results are provided in Table I.

TABLE I

Rubber/Plastic Extrusion Results of Example 1

| Obtained Physical Properties | ASTM Spec. | EPDM | EVA |
|---|---|---|---|
| Unaged: | | | |
| Durometer, Shore A | D-2240 | 52 | 95 |
| Tensile, MPa | D-412 | 12.4 | — |
|  | D-638 | — | 20.05 |
| Elongation, % | D-412 | 640 | — |
|  | D-638 | — | 800 |
| Flexural Modulus, MPa | D-790 | — | 11 |
| Compression Set-22 Hours @ 70° C.: | | | |
| % Set | D-395 | 45 | 80 |
| Ovenaged-70 Hours @ 100° C.: | | | |
| Tensile, % Change | D-573 | −10.0 | — |
| Elongation, % Change |  | −10.0 | — |
| Durometer, Points, Change |  | +4 | — |
| Vicat Softening Temp. °C. | D-1525 | — | 80 |
| Ozone Resistance-70 Hours @ 100 pphm @ 38° C. | | | |
| Rating | D-1171 | No Cracks | No Cracks |
| Brittleness @ −40° C. | D-2137 | Pass | — |
|  | D-746 | — | Pass |

— denotes data is not applicable.

The results in Table I are generally consistent with average values, recited in Table II, obtained from testing several different batches of EVA/EPDM co-extrudate.

TABLE II

Rubber/Plastic Co-Extrudate Average Values

| Typical Physical Properties | ASTM Spec. | EPDM | EVA |
|---|---|---|---|
| Unaged: | | | |
| Durometer, Shore A | D-2240 | 50 | 98 |
| Tensile, MPa | D-412 | 11.0 | — |
|  | D-638 | — | 19.0 |
| Elongation, % | D-412 | 550 | — |
|  | D-638 | — | 650 |
| Flexural Modulus, MPa | D-790 | — | 110 |
| Compression Set-22 Hours @ 70° C.: | | | |
| % Set | D-395 | 21 | 84 |
| Ovenaged-70 Hours @ 100°C.: | | | |
| Tensile, % Change | D-573 | −10.0 | — |
| Elongation, % Change |  | −25.0 | — |
| Durometer, Points, Change |  | +5 | — |
| Vicat Softening Temp. °C. | D-1525 | — | 80 |
| Ozone Resistance-70 Hours @ 100 pphm @ 38° C. | | | |
| Rating | D-1171 | No Cracks | No Cracks |
| Brittleness @ −40° C. | D-2137 | Pass | — |
|  | D-746 | — | Pass |

— denotes data is not applicable.

As can be seen from Tables I and II, the co-extrudate demonstrates excellent ozone resistance, heat resistance and excellent flexibility, even at cold temperatures.

While a preferred embodiment of the invention has been disclosed in detail, along with certain alternative constructions and arrangements, the present invention is not to be considered limited to the precise constructions disclosed herein. Various adaptations, modifications and uses of the invention may occur to those skilled in the art to which the invention relates, and the invention is to cover all such adaptations, modifications and uses falling within the spirit and scope of the following claims.

What is claimed is:

1. A method for manufacturing a rubber plastic co-extrudate, comprising the steps of:
   a. providing a first extruder;
   b. providing a second extruder;
   c. providing the second extruder with a die for co-extruding the plastic and the rubber;
   d. connecting the first extruder to the die;
   e. placing uncured rubber into the first extruder, which is set at a first temperature sufficient to permit the rubber to be extruded;
   f. placing the plastic into the second extruder which is set at a second temperature sufficient to permit the plastic to be extruded, the second temperature being greater than the first temperature;
   g. co-extruding the rubber and the plastic at different temperatures and forming a co-extrudate comprised of a rubber extrudate and a plastic extrudate.

2. The method of claim 1, further comprising the step of exposing the co-extrudate to microwave radiation.

3. The invention of claim 1, wherein the rubber extrudate is comprised of ethylene propylene diene rubber.

4. The invention of claim 1, wherein the rubber extrudate is comprised of a mixture of an ethylene propylene diene rubber and an oil extended ethylene propylene diene rubber.

5. The invention of claim 1, wherein the rubber extrudate is further comprised of carbon black.

6. The invention of claim 1, wherein the plastic extrudate is comprised of ethylene vinyl acetate.

7. A method as recited in claim 1, wherein said co-extruding step forms a continuous cohesive cross-linked interface at a surface of interaction between the rubber extrudate and the plastic extrudate.

8. A method as recited in claim 1, wherein the first temperature is approximately between 150° F. and 175° F. and the second temperature is approximately between 200° F. and 400° F.

9. A method as recited in claim 1, wherein said connecting step comprises a step of placing an extrusion line between the first extruder and the second extruder.

10. A method for manufacturing a unitary co-extrudate article, comprising the steps of:
    a. passing a rubber extrudate segment through a first heating zone of an extrusion device, said first heating zone having a first temperature;
    b. passing a plastic extrudate segment through a second heating zone of said extrusion device, said second heating zone having a second temperature greater than said first temperature;
    c. co-extruding said rubber extrudate segment and said plastic extrudate segment at different temperatures through an orifice of a common die plate; and
    d. forming a continuous cohesive cross-linked interface at a surface of interaction between said rubber extrudate segment and said plastic extrudate segment.

11. A method as recited in claim 10, wherein said forming step comprises a sub-step of shaping the co-extrudate article as said segments, cross-linked at said interface, exit through said orifice of said common die plate.

12. A method as recited in claim 10, comprising the step of setting said first temperature between 150° F. and 175° F.

13. A method as recited in claim 10, comprising the step of setting said second temperature between 200° F. and 400° F.

14. A method as recited in claim 10, wherein said rubber extrudate segment comprises ethylene propylene diene rubber.

15. A method as recited in claim 10, wherein said rubber extrudate segment comprises a mixture of an ethylene propylene diene rubber and an oil extended ethylene propylene diene rubber.

16. A method as recited in claim 10, wherein said rubber extrudate segment comprises carbon black.

17. A method as recited in claim 10, wherein said plastic extrudate segment comprises ethylene acetate.

18. A method as recited in claim 10, wherein said rubber extrudate segment comprises a mixture of ethylene propylene diene rubber and oil extended ethylene propylene diene rubber, a sulfur curing agent, and a cure accelerator, and wherein said plastic extrudate segment comprises ethylene vinyl acetate.

19. A method for manufacturing a unitary co-extrudate article, comprising the steps of:

a. passing a rubber extrudate segment through a first heating zone of an extrusion device, said first heating zone having a temperature approximately between 150° F. and 175° F.;

b. passing a plastic extrudate segment through a second heating zone of said extrusion device, said second heating zone having a temperature approximately between 200° F. and 400° F.

c. co-extruding said rubber extrudate segment and said plastic extrudate segment through an orifice of a common die plate; and d. forming a continuous cohesive cross-linked interface at a surface of interaction between said rubber extrudate segment and said plastic extrudate segment, said forming step including a sub-step of shaping the co-extrudate article as said segments, cross-linked at said interface, exit through said orifice of said common die plate.

* * * * *